Nov. 4, 1958  A. P. ADAMSON ET AL  2,859,026
ACCELERATION RESPONSIVE DEVICE
Filed Dec. 29, 1954
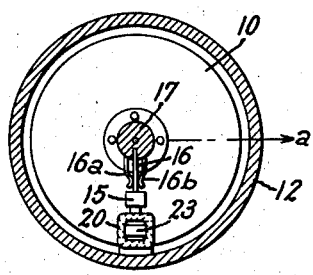
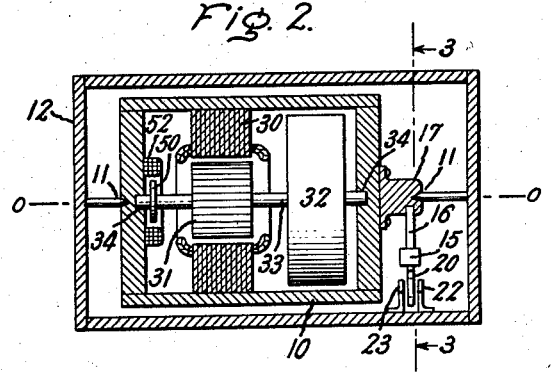
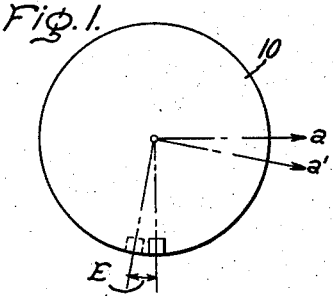
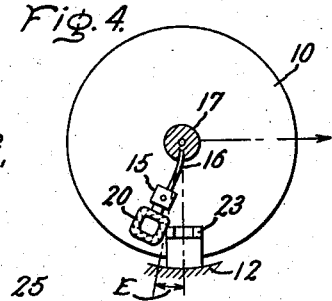
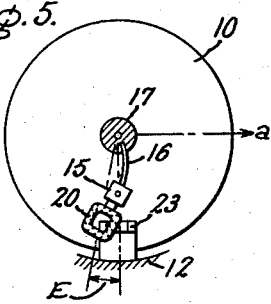
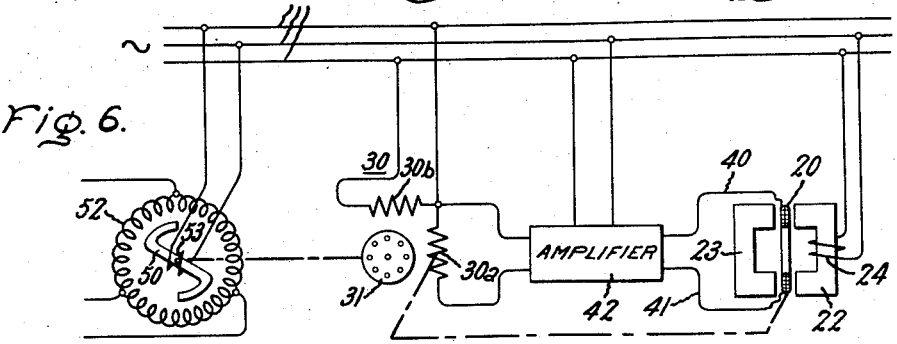
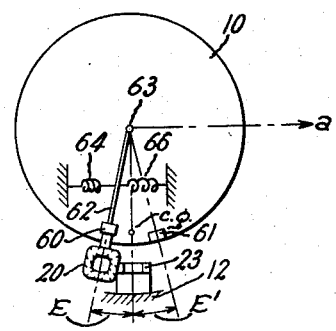
Inventors:
Francis B. Woestemeyer,
Arthur P. Adamson,
by Claude A. Mott.
Their Attorney.

United States Patent Office 2,859,026
Patented Nov. 4, 1958

2,859,026

ACCELERATION RESPONSIVE DEVICE

Arthur P. Adamson and Francis B. Woestemeyer, Schenectady, N. Y., assignors to General Electric Company, a corporation of New York Application December 29, 1954, Serial No. 478,364

7 Claims. (Cl. 264—1)

This invention relates to acceleration responsive devices having an acceleration responsive element rotatably mounted and including an unbalance mass, and has for its object the provision of such a device in which the sensitive axis of the device is maintained in the desired measuring direction during response of the device to acceleration.

The present invention constitutes an improvement on acceleration responsive devices of the type having an acceleration responsive element which is rotatably mounted and which carries an unbalance mass. One device of this type is disclosed and claimed in a copending application of Frithiof V. Johnson, entitled "Acceleration Responsive Device," Serial No. 459,909, filed October 4, 1954, and assigned to the assignee of the present invention.

The Johnson application referred to above discloses an acceleration responsive device having an acceleration responsive element pivotally mounted for free rotation, and having an unbalance mass eccentrically mounted on the acceleration responsive element so as to unbalance the element whereby a torque is imparted to the unbalanced element in response to linear accelerations with resulting angular movement of the unbalanced element. A servo system responsive to this angular movement of the unbalanced element imparts a counter-torque thereto tending to return the element to its original position. When devices of this type are mounted in vehicles, particularly guided missiles, they are on occasion subject to error caused by rotation of the unbalanced element and resulting shifting of the sensitive axis of the unbalanced element away from the direction in which it is desired to measure the accelerations. Thus, as may be seen by reference to Fig. 1, if the acceleration desired to be measured is in the direction "a," then when the freely pivoted unbalanced acceleration responsive element in responding to this acceleration rotates through a small angle E, there is an accompanying shift in the sensitive axis of the device to a'. A servo system of the simple type currently used cannot reduce E to zero since the servo system requires an error signal to produce the counter torque.

Briefly stated in accordance with one aspect of this invention, there is provided an acceleration responsive device of the type having a rotatably mounted acceleration responsive element which is unbalanced with respect to acceleration forces and in which the sensitive axis is restored to the desired measuring direction during response of the device to acceleration. This result is achieved in one form of this invention by mounting an unbalance mass on one end of a spring arm which is secured at its other end to a rotatable unbalanced element so that the arm extends at right angles to the axis of the rotatable element. In addition a movable signal producing means is mounted on the resilient arm, this signal means cooperating with suitable stationary signal means to provide a signal responsive to acceleration, which signal is produced by displacement of the movable signal means by rotation of the element and flexure of the arm, both resulting from the acceleration. The resiliency of the spring arm is such that because of the inertia of the mass, the spring arm bends in response to linear acceleration of the device. The signal thereby produced operates a driving means which turns the element about its axis in a direction such that the center of gravity of the mass will be returned to its original reference plane or angular position about the axis of the rotatable element. When the mass has been returned to this original angular position, the movable signal means is still displaced either bodily or angularly, because of the bending of the spring arm, by an amount which produces a signal for continued operation of the driving means so as to hold the mass in this position during the acceleration, and thereby maintain the sensitive axis of the unbalanced element in the desired direction.

Additional features, advantages and objects of this invention will become apparent and the invention will be better understood from a perusal of the following description taken in connection with the single sheet of drawings, and the scope of the invention will be pointed out in the claims.

In the drawings Fig. 1 is a schematic illustration of the acceleration responsive element showing the shifting of the sensitive axis when the present invention is not used. The angle E is the motion necessary to give the required pickoff signal to the servo system.

Fig. 2 is a sectional view of a device illustrating one embodiment of this invention.

Fig. 3 is a view partly in section taken along the lines 3—3 of Fig. 2, and showing the position of the unbalance means before the device is subjected to accelerations.

Fig. 4 is a diagrammatic view like Fig. 3 showing the instantaneous position of the unbalance means after the device is subjected to accelerations, before the servo system has responded and before the acceleration responsive element has begun to rotate in response to the torque resulting from accelerating the device.

Fig. 5 is another diagrammatic view like Figs. 3 and 4, but showing the position of the unbalance mass during measurement of an acceleration and after the servo system has responded to restore the center of gravity of the unbalance mass to substantially the same plane it was in prior to acceleration of the device.

Fig. 6 is a circuit diagram illustrating the operation of the electrical components of the device shown in Figs. 2 through 5.

Fig. 7 is a diagrammatic illustration of an alternative embodiment of this invention.

Fig. 8 is a diagrammatic illustration of yet another embodiment of this invention.

Referring more particularly to the drawings, an acceleration responsive device is provided comprising an acceleration responsive element freely pivoted for rotation about an axis. In the illustrated embodiment, this element is in the form of a container 10 pivotally mounted by bearing means 11 for rotation about an axis O—O, which axis is shown in a horizontal position, although in an application of this invention this axis was inclined at a substantial angle with the horizontal. The bearing means 11 are mounted within a supporting housing 12 which is fixed with respect to the member whose acceleration is to be measured.

An unbalance means is eccentrically carried by the acceleration responsive element and is adapted to change its position in response to accelerations to which the device is subjected in a direction other than along the axis O—O. At least a portion of the unbalance means is resiliently mounted on the element. In the illustrated embodiment, this unbalance means is in the form of a mass 15 secured at the end of a leaf spring 16, the other end of which is rigidly secured at a point near the axis O—O to a bracket 17 which is in turn carried by the container 10 constituting an unbalanced element. Also forming a part of the unbalance means is a coil 20 which is secured to the lower end of the mass 15 so as to be carried thereby and, as shown, extends downward from the mass 15. In response to linear accelerations of the device, the mass 15 and the coil 20 will change position angularly about the axis O—O because of the flexing of the leaf spring 16 caused by the inertia of the mass 15 as illustrated in Figs. 4 and 5, and also because of resulting rotation of the container 10. It will be understood that mass 15 can be part only of the unbalance means, the remainder being part of the container 10. For purposes of description, it will be considered that the illustrated acceleration responsive element (container 10) without the unbalance means described is perfectly balanced about its axis of support O—O.

Damping means may be provided for preventing long continued vibrations, upon displacement, of the resiliently mounted unbalance means. This damping means as illustrated is in the form of spring fingers 16a and 16b disposed on opposite sides of the leaf spring 16 and cooperating therewith. The mounting point of each spring finger is displaced from the instantaneous center of motion of the spring 16 and is mounted so that there is sliding motion during flexing of the spring 16. It will be readily appreciated by those skilled in the art that other forms of damping may be used, e. g., electromagnetic, pneumatic or hydraulic dampers. Furthermore, although an effective means for damping is shown, a greater or less degree of damping may be required for any particular set of design requirements, so that in some cases no damping means as such will be needed.

Pickoff means are provided for producing a signal in response to the change in position of the resiliently mounted unbalance means whether such change is caused by rotation of the container 10 or by flexing of the resilient mounting. The illustrated form of this pickoff means comprises the coil 20, which changes position along with the mass 15, disposed within the air gap of a closed magnetic circuit made up of magnetizable members 22 and 23 secured to the housing 12. The magnetic circuit made up by members 22 and 23 is energized by a winding 24 connected to a source of A.-C. voltage 25 and the coil 20 is energized from the same source 25. When the coil 20 moves from its original position within the air gap, a signal is produced.

Means are provided responsive to the signal produced by this change in position for imparting a torque to the acceleration responsive unbalanced element 10 in a direction tending to restore the pickoff signal to its original value. This original value is the value of the signal in the absence of the particular accelerations which it is desired to measure, and it may be zero or some finite value. This restoring means in the illustrated embodiment is in the form of an electric motor mounted within the container 10 and circuit means for applying the signal produced by the pickoff means to the motor. The motor includes a stator 30, a rotor 31, and a flywheel 32 mounted on the rotor shaft 33. The shaft 33 is mounted for rotation by bearing means in the form of journals 34 provided in the container 10, the journals 34 defining an axis coincident with the axis O—O. The circuit means includes the leads 40 and 41 connecting the coil 20 through an amplifier 42 to one phase 30a of the stator 30 of the two phase motor. The other phase 30b of the stator 30 is connected to the power source 25. The power for the amplifier 42 and for energizing the pickoff coil 20 is also obtained from the source 25. Flexible connectors, suitably insulated (not shown in the drawing) are used to transmit power and signals between the container 10 and the housing 12 in accordance with the circuit shown in Fig. 6.

The pickoff signal is applied to the motor so that the rotation of the rotor 31 and the flywheel 32 will be in the same direction as the change of position of the unbalance mass 15 caused by the acceleration, whereby the reaction torque on the stator will be in the opposite direction acting to cause rotation of the container 10 and tending to restore the pickoff signal to its original value. It is seen from Fig. 4, that when the unbalance mass and the pickoff coil deflect in response to acceleration, the pickoff coil since it is positioned a greater distance from the axis O—O, deflects through an angle greater than the mass 15 and greater than the error angle E needed to actuate the motor at speeds corresponding to the acceleration being measured. As shown in Fig. 5 when the motor responds and rotates the pickoff coil counter-clockwise to a position in which its deflection is equal to the error angle E, the center of gravity of the unbalance mass is returned to the reference plane containing the axis O—O and perpendicular to the direction "a" of the acceleration.

The device is so constructed and arranged that while it is responding to accelerations, the center of gravity of the unbalance mass is restored to substantially the same plane it was in prior to acceleration, i. e. the same angular position about the axis O—O, thereby maintaining the sensitive axis of the device in the desired measuring direction. As shown in Fig. 5, the mass has been restored, by counterclockwise rotation of the container 10, to a position with its center of gravity lying in a plane perpendicular to the sensitive axis "a." The selection of the spring constants of the leaf spring 16 and the response of the motor which imparts the counterclockwise restoring torque to the container 10 are made such that the appropriate pickoff error signal to properly respond to the acceleration being measured will be obtained when the center of gravity of the unbalance mass is restored to the reference plane while the spring 16 is flexed as shown in the position of Fig. 5.

It will be understood that the flexure of the spring 16 depends upon the rate of the acceleration being measured. With a higher rate of acceleration a greater flexure is required to restore the mass to the reference plane, while the coil 20 will take a position to the left of that shown in Fig. 5, thereby to provide a suitably increased error angle E. When the device is mounted with the axis O—O inclined at a substantial angle with the horizontal, the unbalanced element 10 is initially turned to the position shown in Fig. 3. It may be initially set by hand manipulation in that position, temporarily secured in that position by suitable means (not shown) and later released by timing mechanism (not shown) for operation.

Means are provided for obtaining a signal proportional to the displacement of the rotor with respect to the container 10. As illustrated in Fig. 6, this means is in the form of a selsyn mounted within the container 10 and comprising a rotary member 50 mounted on the shaft 33 and a field winding 52 mounted in the container 10. The energizing winding 53 for the rotor of the selsyn receives power from the source 25. The output voltage from the field 52 of the selsyn may be used as a control signal in the energization of an autopilot used in the actuation of the control surfaces of the aircraft or missile in which the acceleration responsive device of this invention is used. An example of such an autopilot may be seen in U. S. Patent 2,416,097 to Hansen, Jewell, Johnson and Porter.

In the alternative embodiment shown in Fig. 7, the unbalance means comprises two separate masses 60 and 61. The mass 60 moves through the same angle as the pickoff coil 20, being mounted at the end of a rigid beam 62 which is pivotally mounted for rotation with respect to the container 10 as at 63. The mass and beam arrangement is spring centered by springs 64 and 66 which are attached at one end to the beam 62 and at their other end to the container 10. The other mass 61 is rigidly secured to the container 10 and moves with the container 10. The pickoff means described with reference to Figs. 2–5 may also be used with Fig. 7, the coil 20 being carried by the mass 60 and the beam 62. The position shown in Fig. 7 is that assumed by the device during response to an acceleration in the direction "a," and after the servo system has rotated the container 10 through an angle E'. It will be noted that each of the masses 60 and 61 has been rotated through an angle, E and E' respectively, and the spring constants and servo system are designed so that the center of gravity of the total unbalance means is restored to substantially the same plane as prior to acceleration, which is at right angles to the desired measuring direction "a." It will be apparent to those skilled in the art that angles E and E' and masses 60 and 61 in Fig. 7 may be equal to each other or alternatively may be greatly unequal depending on the particular design requirements. Damping means (not shown in Fig. 7) may be provided as required in a similar manner to that described in connection with Fig. 3.

A further alternative embodiment of this invention is diagrammatically shown in Fig. 8. In this embodiment the pickoff for the servo system is a photoelectric system including a photoelectric tube 70 which senses the angular position of a small mirror 71 mounted on the unbalance mass 15a by sending a light beam 72 and receiving the deflected light beam 73. By means of the spring arm 16a, the mass 15a and the mirror 71 are mounted so that the position of the mirror changes as a function of acceleration at the same time a torque is imparted to the acceleration responsive element 10. Change in the angular position of the mirror 71 produces a signal in the photoelectric tube 70 which signal is utilized in the same manner as that produced in coil 20 and in conductors 40 and 41 of Fig. 6 to energize the restoring means for applying a countertorque to the rotatable unbalanced element 10. Thus, flexure of the spring arm 16a and proper choice of spring constant enables the center of gravity of the mass 15a to be returned to the plane of the desired measuring direction during response to acceleration. For example, the spring constant may be chosen so that in response to acceleration the mirror 71 rotates through an angle E in which case the beam of light is reflected through an angle 2E during response of the device to acceleration. Then if E is chosen as one-half the value of the error angle required to energize the restoring means to measure the acceleration, then the mass 15a is maintained with its center of gravity in the plane of the desired measuring direction.

While particular embodiments of the invention have been illustrated and described, modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed as new and desired to be secured by United States Letters Patent is:

1. An acceleration responsive device comprising an acceleration responsive element pivoted for rotation about an axis, unbalance means at least a portion of which is resiliently mounted in eccentric relation on said element and adapted to move from a predetermined plane in response to acceleration of said element in a direction desired to be measured, pickoff means for producing a signal in response to the change in position of the resiliently mounted portion of the unbalance means whether such change is caused by rotation of said element or by flexing of the resilient mounting, and means responsive to said signal for imparting a torque to said acceleration responsive element in a direction tending to restore said pickoff signal to its original value, said device being so constructed and arranged that while it is responding to acceleration the center of gravity of said unbalance means is restored to substantially said predetermined plane thereby maintaining the sensitive axis of the acceleration responsive device in the desired measuring direction.

2. An acceleration responsive device comprising an acceleration responsive element freely pivoted for rotation about an axis, an unbalance mass carried by said element, at least a portion thereof being resiliently mounted for flexibility in the direction of the accelerations desired to be measured, said mass being adapted to change position in response to accelerations, pickoff means for generating a signal in response to the change in position of the resiliently mounted portion of said unbalance mass whether such change is caused by rotation of the element or by flexing of the resilient mounting, a servo system responsive to said signal and operative to impart a torque to said rotatable element in a direction tending to restore said pickoff signal to its original value, at least part of said pickoff means being resiliently mounted so as to introduce a signal substantially equal and opposite in net effect to the error inherently present due to finite gain of the servo system.

3. An acceleration responsive device comprising an element mounted for rotation about an axis, an unbalance mass, resilient means mounting said mass on said element a predetermined distance from said axis, signal means responsive to displacement of said mass resulting from acceleration of said element in a direction desired to be measured, and driving means responsive to said signal means for rotating said element in a reverse direction about said axis, said resilient means being constructed and arranged to yield because of the inertia of said mass upon such acceleration thereby to produce an additional signal for effecting return of said mass to a predetermined angular position about said axis during such acceleration.

4. An acceleration responsive device comprising a support, an element rotatably mounted upon said support for rotation about an axis, an unbalance mass, resilient means mounting said mass on said element a predetermined distance from said axis so that said resilient means is bent by the inertia of said mass upon linear acceleration of said support in a direction desired to be measured, signal means responsive both to rotation of said element and flexure of said resilient means resulting from such acceleration, and driving means responsive to said signal for rotating said element in a reverse direction about said axis so as to return said mass to a predetermined angular position about said axis during such acceleration.

5. An acceleration responsive device comprising a support, an element mounted on said support for rotation about an axis, an unbalance mass, resilient means mounting said mass on said element, said resilient means being constructed and arranged to be bent by the intertia of said mass upon linear acceleration of said support in a direction desired to be measured, stationary signal means mounted on said support, movable signal means mounted on said resilient means cooperating with said stationary signal means to provide a signal in response both to rotation of said element and flexure of said resilient means during such acceleration, and driving means responsive to said signal for rotating said element about said axis so as to maintain said mass in a predetermined angular position about said axis during such acceleration.

6. An acceleration responsive device comprising a support, an element mounted on said support for rotation about an axis, a spring arm secured at one end to said element at a point near said axis and extending at right angles to said axis, an unbalance mass secured to the other end of said arm, said spring arm being constructed and arranged to be bent by the inertia of said mass upon linear acceleration of said support in a direction desired to be measured, stationary signal means mounted on said support, movable signal means mounted on said arm cooperating with said stationary signal means to provide a signal in response both to rotation of said element and flexure of said spring arm resulting from such acceleration, and driving means responsive to said signal for rotating said element about said axis in a direction to return said mass to a predetermined angular position about said axis during such acceleration and thereby maintaining the sensitive axis of the device in a predetermined measuring direction.

7. An acceleration responsive device comprising a support, a hollow cylindrical element mounted on said support for rotation about its center line as an axis, a spring arm secured at one end to said element at a point near said axis and extending at right angles to said axis, an unbalance mass secured at the other end of said arm, said spring arm being constructed and arranged to be bent by the inertia force of said mass upon linear acceleration of said support in a direction desired to be measured, stationary magnetic signal means mounted on said support, a signal producing coil mounted on said arm a greater distance from said axis than said mass cooperating with said magnetic signal means to provide a signal in response both to rotation of said element and flexure of said spring arm resulting from such acceleration, and motor means mounted in said element and responsive to said signal for rotating said element about said axis in a direction to return said mass to a predetermined angular position about said axis during such acceleration and thereby maintain the sensitive axis of the device in a predetermined measuring direction.

References Cited in the file of this patent

UNITED STATES PATENTS 2,801,097  Adamson _____ July 30, 1957